Oct. 6, 1942.
E. A. WILCKENS ET AL
2,297,847
ARTICLE SEPARATING MECHANISM
Filed March 31, 1941
3 Sheets-Sheet 1
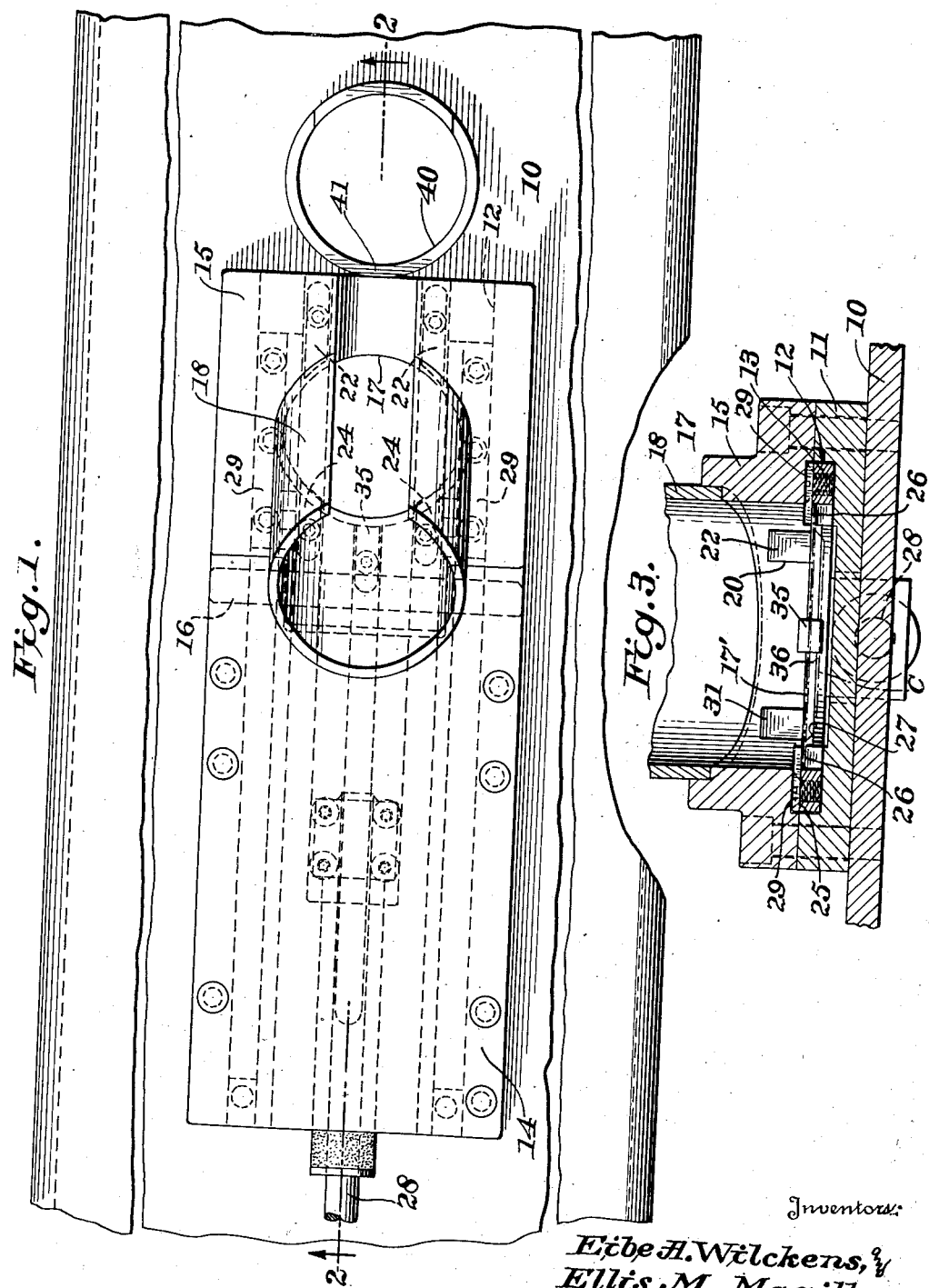
Inventors:
Eibe A. Wilckens,
Ellis M. Magill,
By Cushman Darby & Cushman
Attorneys.

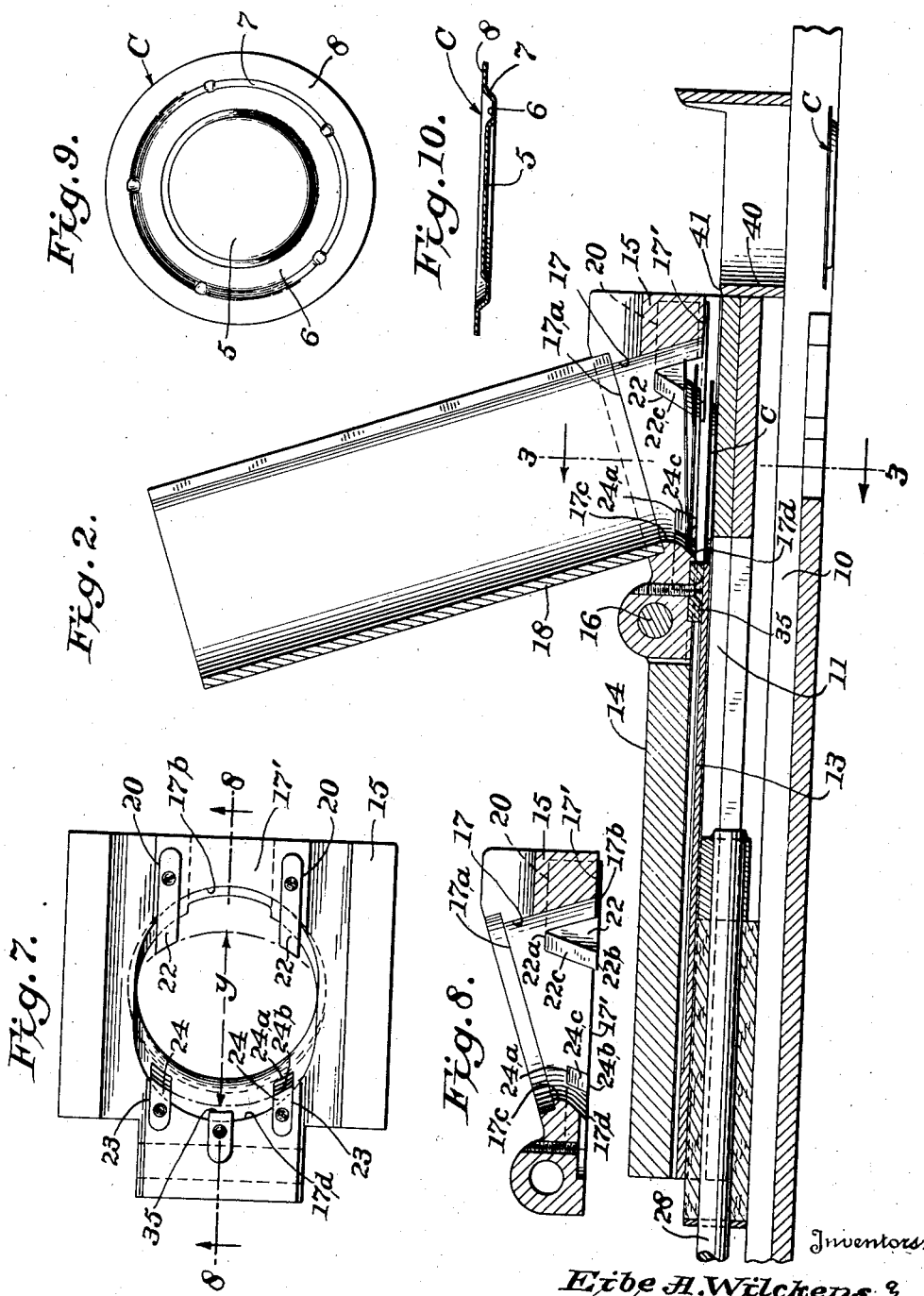

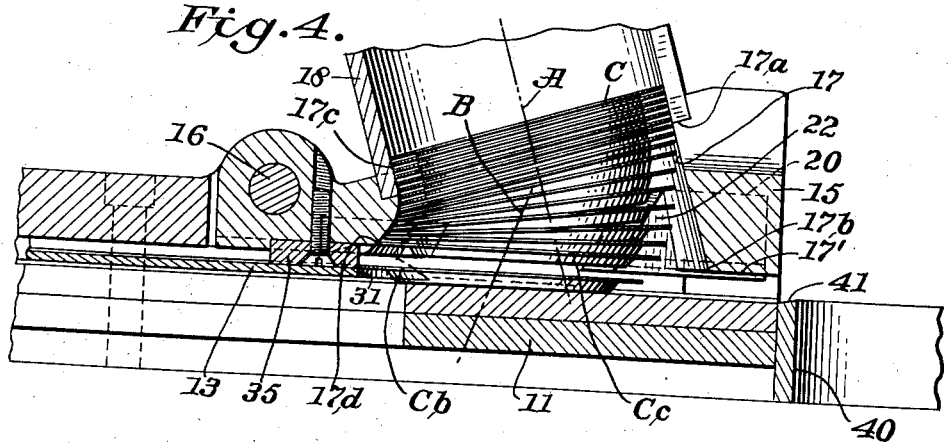
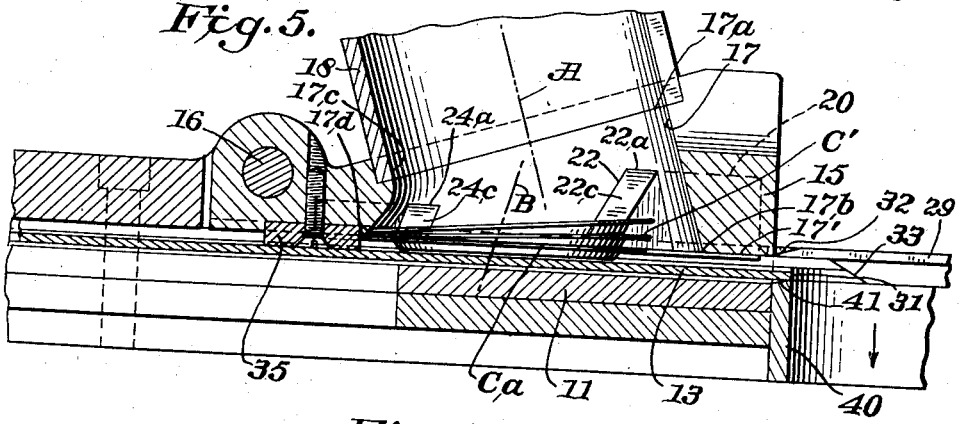
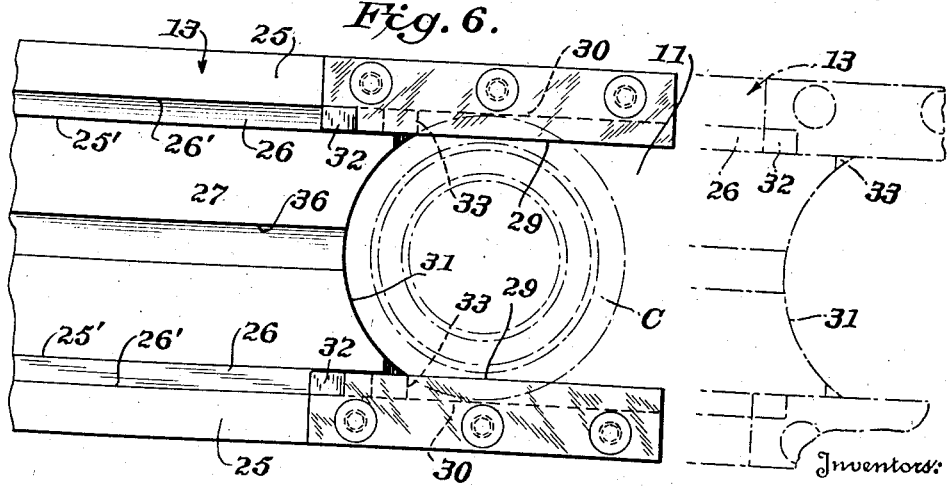

Patented Oct. 6, 1942

2,297,847

UNITED STATES PATENT OFFICE 2,297,847

ARTICLE SEPARATING MECHANISM

Eibe A. Wilckens and Ellis M. Magill, Baltimore, Md., assignors to Crown Cork & Seal Company, Inc., Baltimore, Md., a corporation of New York Application March 31, 1941, Serial No. 386,192

11 Claims. (Cl. 214—8.5)

The present invention relates to an article separating mechanism.

The invention particularly involves a mechanism for separating hat-shaped caps including a low cup-like body having a top wall, a very shallow skirt and a flat peripheral flange. However, the invention is applicable for the separation of other flat articles, including can ends.

The lowermost article can readily be removed from a stack of articles of substantial thickness simply by applying a pushing element to the edge of the lowermost article, the pushing element having a thickness very slightly less than that of the articles being handled. However, if the articles are extremely thin it is usual to move a separating element of knife-like form toward the stack to engage the latter immediately above the lowermost article. Such separating elements ordinarily comprise a pair of blades which engage diametrically opposite points of the stack above the lowermost article so as to, in effect, slice the lowermost article from the stack.

In the handling of extremely thin articles it has heretofore been proposed to fan out or otherwise separate the group of articles next to the outlet or lower end of the stack in order that the article nearest the outlet can be more readily engaged by a sliding or pushing element and the latter will not contact or engage the next adjacent article. The disadvantages of such prior arrangements are hereinafter discussed in detail.

An important object of the present invention is to provide an article separating mechanism including a stack device which includes means to give a marked spacing to the articles nearest the stack outlet.

In the handling of hat-shaped caps formed of thin metal, it is difficult to separate the lowermost cap from a vertical stack due to the fact that the caps nest and the flanges of adjacents caps lie so close together that a separating element cannot be relied upon to get between the flange of the lowermost cap and the flange of the next adjacent cap. This difficulty increases with any increased thinness of the metal of which the caps are formed. That is, if the metal is extremely thin, the flanges may become slightly waved along radial lines due to stamping of the cap to its hat-shaped form. Also, if the flanges are of thin metal and are stamped to have radial corrugations or grooves formed therein, the grooving step may increase the radial undulations.

Naturally, any undulations in the flanges may result in portions of the flanges of two adjacent caps coming into direct contact so that a separating element may remove two caps instead of one. This difficulty is encountered even if such types of caps are fanned out in any heretofore practical manner. Simultaneous removal of two caps is particularly undesirable if the caps are being separated for delivery to an apparatus for applying a coat of lining material because, with two caps nested, only the top cap will be lined.

As has been stated above, it has heretofore been proposed to fan out the outfeed or removal end of a stack of articles such as can ends or caps by placing them in a stack which is bent or curved through substantially 90° adjacent its outlet end so as to provide adequate spacing. However, the application of that idea to a situation requiring that the removed article lie in a horizontal plane necessitates that the axis of the stack also lie in a horizontal plane. Naturally, if the body or main length of the stack is to lie in a horizontal plane, some means must be provided to urge the stack along a horizontal line as well as to hold the articles upright or on edge. Since the articles are usually placed in the stack at irregular intervals and in batches comprising varying numbers of articles, the difficulty of regulating any presser or feeding member will be apparent.

In short, it is extremely desirable that the main length or body of the stack of articles be maintained in a substantially vertical line so that the weight of the articles will act to force them toward the outlet end of the stack. However, if the main length of the stack is to be maintained vertical, and if it is also necessary that the articles lie in a horizontal plane when removed, no sharp bend can be provided in the stack. The use of such a bend for fanning purposes is therefore altogether impossible under any specifications requiring that the stack be vertical and that caps be removed while lying horizontal.

Also, mere movement of an article through a 90° or other marked bend is not always sufficient to separate every article because some articles may adhere even while moving through the bend.

A further object of the invention is to provide an article spacing means which will positively space each article before it is engaged by any removing member.

Another important object of the invention is to provide means at the outlet or lower end of the stack whereby, despite the provision of only such a slight bend in the stack that the axis of its body portion will be in a substantially vertical plane, articles moving through the bend will be adequately spaced for separation while in a plane substantially normal to the axis of the stack.

Generally speaking, this feature of the invention involves the provision of means which will increase the article spacing which has been initiated by the movement of the articles through a slight bend provided in the stack.

It has also been heretofore proposed to separate stacked articles by having them engaged by a moving separator, such as a rotating threaded element. Unless thin articles are initially spaced before engagement by any such means, the latter will obviously be no more satisfactory than any other separating or article removing means. In other words, in handling extremely thin articles, it is necessary to move them through a path of such form that they will be sufficiently spaced that some mechanical means can then readily engage and remove a single article.

Another object of the invention is to provide an arrangement for spacing caps or other articles which is of such design that it will exert a minimum friction or drag upon the edges of the articles.

It will be apparent that any arrangement which exerts a drag upon the articles will urge them more closely together.

Another object of the invention is to provide means whereby flat articles moving through a horizontal plane will be caused to drop through a vertical chute or the like without turning or flipping to a vertical or edge-wise position as they drop down the chute.

Other objects and advantages of the invention will be apparent from the following drawings, wherein:

Figure 1 is a top plan view of the mechanism.

Figure 2 is a vertical central sectional view through the apparatus on the line 2—2 of Figure 1 and showing the lowermost cap detached from the cap stack by the removing element.

Figure 3 is a transverse section on the line 3—3 of Figure 2.

Figure 4 is a fragmentary view similar to Figure 2, but on a larger scale, and showing the position of the caps or other articles after the lowermost cap has been detached from the stack.

Figure 5 is a view similar to Figure 4 but showing the position of the caps before detachment of the lowermost cap from the stack.

Figure 6 is a top plan view of the removing or slide element.

Figure 7 is a bottom plan view of the cap chute element.

Figure 8 is a vertical section view on the line 8—8 of Figure 7 but with the guide blocks removed.

Figure 9 is a top plan full size view of the caps referred to herein, and

Figure 10 is a diametrical sectional view of the cap of Figure 9.

The present application describes the use of the present invention with caps C of the type illustrated in Figures 9 and 10, which comprise a top wall 5, including an annular groove 6, a shallow skirt 7 and a wide peripheral flange 8. In the application of such a cap to a container, the flange 8 is bent down around the container lip.

The numeral 10 designates the base casting of the mechanism, which has a plate 11 secured to its upper surface. Plate 11 has a slideway 12 formed in its upper surface, in which an article removing or slide element 13 is mounted for reciprocable movement. A cover 14 is bolted to the upper side of plate 11, cover 14 having a bracket 15 pivotally connected thereto, as indicated at 16. Bracket 15 has a bore 17 extending through the same, the axis of the upper portion of this bore being at a slight angle to the vertical, for example, approximately 17°, and a tube 18 is fitted in the upper end of the bore 17 so that the inner surface of the tube will be flush with the upper surface of the bore. Tube 18 is arranged at the same angle with respect to the vertical as the upper portion of bore 17.

The upper edge 17a of bore 17 is circular and the semi-circular portion of the wall of the bore to the right of the axis line A in Figures 4 and 5 is a development of a semi-circle from the upper edge 17a to the lower edge 17b. However, the portion of the wall of bore 17 to the left of the axis A is only a semi-circle at its upper edge 17c, and below this edge the wall is curved away from the opposite side of the bore, as indicated at 17d. As a result, the bore 17, when viewed from the bottom as in Figure 7, is not a true circle, but is of a form such as would be defined by two semi-circles having their centers spaced a fraction of an inch apart, and with the abutting edges of the semi-circles joined by short, straight lines. However, a semi-circle would be defined in any plane intersecting the wall between edges 17c and 17d, such semi-circles being increasingly to the left (in Figures 4 and 5) in planes approaching lower edge 17d.

A pair of recesses 20 extend upwardly from the lower surface 17' of bracket 15, these recesses extending parallel to each other and also parallel to the plane in which the axis A lies as shown in Figure 7. A guide block 22 is positioned in each recess and, as best indicated in Figures 2, 5 and 8, the outer face 22c of each guide block is inclined outwardly from its upper edge to its lower edge, so that it correspondingly diverges from the adjacent surface of the bore 17. That is, referring to Figure 8, the upper edge 22a of each block is substantially flush with the adjacent surface of bore 17, while its lower edge 22b is spaced inwardly from the adjacent bore surface. Furthermore, the outer faces of the blocks 22 are arranged at such relative angles with respect to each other that they generally define between them a V-shaped chute along which the caps may move downwardly.

Directly opposite the recesses 20, a second pair of recesses 23 are provided in the bracket 15, and blocks 24 are mounted in these recesses. The upper edges 24a of blocks 24 lie flush with the adjacent portion of bore 17, but the lower edges 24b of the blocks are spaced very slightly inwardly from the wall of the bore, as indicated in Figure 8. The outer faces of the blocks 24 are also so angled that they substantially define a V-shaped chute opposed to the V-shaped chute formed by the blocks 22.

As a result of the opposed V-shaped chute arrangement provided by the opposed and outer surfaces of the blocks 22 and 24, and also because the vertical faces 22c incline toward their lower ends toward the vertical faces 24c of the blocks 24, these vertical surfaces define between them a frusto-conical figure having the axis B, which axis is inclined with respect to axis A by a sufficient angle that caps moving from along axis A must fan out before they can move on down along axis line B.

In addition, the inner and lower edges 24b of the blocks 24 are spaced from the opposed lower edges of blocks 22 an insufficient distance to permit a cap C to lie horizontal between them. Hence, as the caps move along axis B, the fanned relation already given them will be maintained and accentuated as they move on down along the blocks 22 and 24, because a cap C cannot lie normal to axis B but must cant and have its right hand edge well above the horizontal as in Figures 4 and 5.

The lower surfaces of the blocks 24 are flush with the lower surfaces 17' of bracket 15 as shown in Figure 8, while the lower surfaces of the blocks 22 are slightly below surface 17'.

Referring to Figures 3 and 6, slide 13 includes longitudinally extending shoulders 25 at its side edges and just within these are ledges 26, ledges 26 being just sufficiently below shoulders 25 that a cap flange may rest upon the ledges without projecting above the shoulders. The edges 26' of the shoulders are far enough apart to permit a cap C to rest between them on the ledges, and the edges 25' of the ledges are so spaced that the body of a cap will readily fit between them. Between ledges 25 slide 13 is grooved as indicated at 27, this groove being of a depth corresponding to the thickness of a cap C.

The slide 13 is adapted to be reciprocated by any suitable driving means acting through a rod 28.

Figure 5 shows the slide 13 in its right hand position so that blades 29 secured to the upper surfaces of extensions 30 of the shoulders 26 are to the right of the blocks 22. It will be noted from Figure 6 that slide 13 has its forward edge 31 curved on an arc corresponding to the diameter of a cap C. The approach edges 32 of the blades 29 are downwardly beveled and, immediately to the right of these edges (in Figure 6) the ledges 26 terminate in downwardly beveled edges 33 so that a cap entirely beneath the blades 29 will not be supported by the slide but will rest upon the bottom surface of groove 12 in plate 11.

As indicated in Figure 5, when the lower (left-hand in Figure 5) edge of a cap as at C' reaches the extreme lower portions of the blocks 24, that edge will rest on the flange of a cap at C<sup>a</sup> which is at that moment lying horizontal on the upper surface of ledges 26. The cap at C' will have its opposite or right-hand edge (Figure 5) still resting on the blocks 22 so that it will be sufficiently inclined with respect to the cap at C<sup>a</sup> that a space will exist between the blank flanges 8 of the caps at diametically opposite points intermediate their left and right hand edges in Figure 5.

When the slide 13 moves from the position of Figure 5 to that of Figure 4 and approaches the widest spaced edges of the lowermost cap at C<sup>a</sup> and the next adjacent cap at C', the advancing edges 32 of blades 29 will detach the cap C<sup>a</sup> from the stack. During this separating movement the cap at C<sup>a</sup> will be urged against a block 35 fixed to the undersurface of bracket 15, and which extends into a central longitudinal groove 36 in the upper surface of slide 13. Block 35 will thereby prevent the cap at C<sup>a</sup> from being moved to the left in Figure 5 with the removing element and the blades 29 will therefore pass entirely over the cap, which will slide off ledges 26 and down upon plate 11 in front of the curved pushing surface 31 of the slide. This position C<sup>b</sup> of the cap, formerly at C<sup>a</sup>, is shown in Figure 4.

In the meantime, the cap at C' in Figure 5 will move down to the position C<sup>c</sup> in Figure 4, with its flange resting on top of the blades 29. When the slide returns to the left and carries the cap at C<sup>b</sup> with it, cap C<sup>c</sup> will be held against right hand movement by the blocks 22. When the blades 29 have moved from beneath the cap at C<sup>c</sup> it will drop flat upon the ledges 26 to position C<sup>a</sup> shown in Figure 5, while the next cap above, at C', will still be inclined on the blocks 22 as shown in Figure 5.

In the present embodiment, slide 13 moves the caps to a chute 40 down which they drop to lie flat for subsequent movement to an apparatus which places a liner in the groove 6. In order that the caps will not turn downwardly as they move over the edge 41 of chute 40 and stand on edge in the chute, the chute edge 41 is upwardly inclined as shown in Figures 4 and 5. Thus, an approaching cap will be angled slightly upwardly as it moves over edge 41 and hence will drop flat down the chute when it entirely clears the edge 41.

As has been stated above, the caps will fan as they move about the slight elbow between axis A and axis B. Also, they will be further fanned as they move down the blocks 22 and 24, due to the slight convergence of these blocks toward the lower end of axis B as well as because the lower and opposed edges 22b and 24b of blocks 22 and 24 are not spaced far enough apart to permit a cap to lie horizontal between these edges of the blocks.

Stated in another way, and as shown in Figure 7, the planar elliptical figure defined within the lower edges 22b and 24b of the blocks 22 and 24 has a minor diameter $y$ in a horizontal plane which is less than a cap blank diameter. Hence, a cap blank cannot lie in a horizontal plane or in a plane parallel to the removal slide 13 so long as any portion thereof is resting either on all four blocks or only on blocks 22.

It will be noted that the diameter $y$ coincides with the line of movement of slide 13 so that a cap at position C' in Figure 5 will certainly be tilted upwardly along that line so that the knife edges 32 will move beneath it to remove the lowermost cap at C<sup>a</sup>.

The terminology used in the specification is for the purpose of description and not of limitation, the scope of the invention being indicated in the claims.

We claim:

1. In a mechanism for separating flat articles, a chute to support articles in a stack and including a bent portion to arrange the articles in fanned relationship, means adjacent the bent portion to increase the spacing of the articles, and means to remove the article nearest the chute outlet.

2. In a mechanism for separating substantially flat articles, a chute to support articles in a stack and including a body portion and an outlet portion, moving means to remove the article nearest the outlet portion, the axis of the outlet portion being inclined wtih respect to the axis of the body portion and of reduced diameter along the direction in which said means moves so as to cause articles to be angled with respect to the plane in which said means moves.

3. In a mechanism for separating substantially flat articles, a chute to support articles in a stack and having an upper portion inclined slightly to the vertical, and a lower portion inclined with respect to the upper portion, moving means to remove the lowermost article, said lower portion being of slightly reduced diameter along the direction in which said means moves so as to cause articles to be angled with respect to the plane in which said means moves.

4. In a mechanism for separating substantially flat articles, a chute to support the articles in a stack and having an upper portion inclined slighty to one side of the vertical, a lower portion inclined slightly to the opposite side of the vertical, means to remove the lowermost article, said lower portion being of slightly reduced diameter along the direction in which said means moves so as to cause articles to be angled with respect to the plane in which said means moves.

5. In a mechanism for separating flat articles, a chute to support articles in a stack and including a body portion and an outlet portion, means in the outlet portion of the chute and extending longitudinally thereof to space apart the articles, and means to remove the article nearest the outlet.

6. In a mechanism for separating flat articles, a chute to support articles in a stack and having its upper portion inclined to the vertical, the outlet at the bottom of the chute lying in a horizontal plane so that articles moving from the upper portion will have a fanned relationship adjacent the outlet, means adjacent the outlet to increase the fanned relationship of the articles, and means to remove the lowermost article.

7. In a mechanism for separating flat articles, a chute to support articles in a stack and having its upper portion inclined to the vertical, the outlet at the bottom of the chute lying in a horizontal plane so that articles moving from the upper portion will have a fanned relationship adjacent the outlet, means adjacent the outlet to increase the fanned relationship of the articles, said means comprising opposed elements having non-parallel article engaging faces, and means to remove the lowermost article.

8. In a mechanism for separating flat articles, a chute to support articles in a stack and having its upper portion inclined to the vertical, the outlet at the bottom of the chute lying in a horizontal plane so that articles moving from the upper portion will have a fanned relationship adjacent the outlet, means adjacent the outlet to increase the fanned relationship of the articles, said means comprising opposed elements having their article engaging faces converging toward the outlet, and means to remove the lowermost article.

9. In a mechanism for separating flat articles, a chute to support articles in a stack and having its upper portion inclined to the vertical, a lower portion inclined reversely to the upper portion and an intermediate portion forming an elbow between said two first-named portions so that articles will assume a fanned relationship before moving into the lower portion, means in said lower portion to incline articles with respect to the axis of said lower portion, and a moving member beneath said lower portion to initially support the lowermost article therein in a horizontal plane and then separate said article from the article next above.

10. In a mechanism for separating flat articles, a chute to support articles in a stack and having its upper portion inclined to the vertical, a lower portion inclined reversely to the upper portion and an intermediate portion forming an elbow between said two first-named portions so that articles will assume a fanned relationship before moving into the lower portion, moving means beneath said outlet portion to support the lowermost article in a horizontal plane and, by continued movement, separate said article from the article next above, and means in the lower portion of said chute to support the edge portion of the next above article nearest the approach of said moving means in spaced relationship to the corresponding edge of the lowermost article.

11. In a mechanism for separating flat articles, a base plate, a stack enclosing chute above the base plate, a receiving chute extending downwardly from the base plate, a moving member to remove the lowermost article from the stack enclosing chute and move the same along the base plate to the receiving chute, the edge of the base plate adjacent the receiving chute being upwardly inclined so that articles moving toward the receiving chute will be directed slightly upwardly whereby they will lie in a substantially horizontal plane while dropping down said chute.

EIBE A. WILCKENS.
ELLIS M. MAGILL.